J. A. MacLEAN.
NUT LOCK.
APPLICATION FILED DEC. 11, 1916.

1,326,279.

Patented Dec. 30, 1919.

Inventor
J. A. MacLean
By Fetherstonhaugh & Co
Attys.

UNITED STATES PATENT OFFICE.

JOHN A. MacLEAN, OF WILMETTE, ILLINOIS.

NUT-LOCK.

1,326,279.     Specification of Letters Patent.     Patented Dec. 30, 1919.

Application filed December 11, 1916. Serial No. 136,349.

*To all whom it may concern:*

Be it known that I, JOHN A. MACLEAN, a citizen of the United States, and resident of Wilmette, in the State of Illinois and United States of America, have invented certain new and useful Improvements in Nut-Locks, of which the following is a full, clear, and exact description.

This invention relates to improvements in nut locks, and the object of the invention is to provide a simple, inexpensive, durable and efficient nut lock which may be applied with a wrench in the ordinary manner without the necessity of using special tools.

A further object is to provide a nut lock which may be used either above or below the nut.

The device consists essentially of a metal body of suitable form, double concave in the direction of one of its diameters, and threaded at a slight incline to its axis, so that when screwed on to a bolt, one corner will engage the nut before others, so that when further tightened down, the nut will be slightly twisted. In addition to this, the double concave formation causes the edges of the nut to touch a surface perpendicular to the bolt before the central part of the body touches, so that if the nut is further screwed down, the body will be bent so as to flatten one side of the nut and increase the concavity on the opposite side.

In the drawings which illustrate the invention:—

Figure 1:
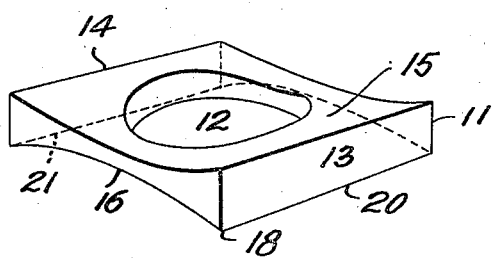
Figure 1 is a perspective view of the nut blank according to this invention.

Referring more particularly to the drawings, 11 designates a nut blank cut from a bar rolled to the cross section shown at the left hand end, and provided with a centrally disposed aperture 12. The cross section peculiar to this invention is a double concave formation in the direction of one diameter, the curvature on each face being irregular, so that at one side of the nut, designated 13, the curvature of what may be called the top 15 is of much less radius than the curvature adjacent the other side 14. On the bottom 16 of the nut, the conditions are exactly reversed, that is, the curvature adjacent the side 14 is of much shorter radius than the curvature adjacent the side 13. The result is that the nut may be said to consist of a diametrically extending central portion of approximately uniform thickness arranged in a plane inclined to the plane of the body as a whole, said central portion thickening rapidly to the sides of the nut.

Figure 2:
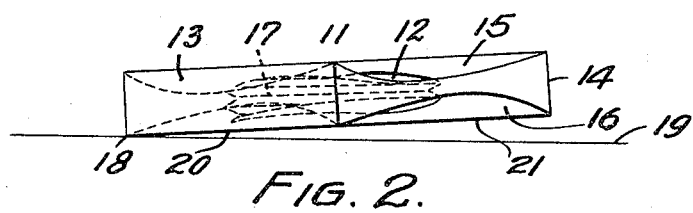
Fig. 2 is an elevation of the nut illustrating the angular disposition of the threading.

The central aperture 12 is screw-threaded, as at 17, these threads being formed at a slight angle to the axis of the nut by supporting the nut in a slightly inclined position, preferably in the direction of one of its diagonals, as indicated in Fig. 2, during the threading operation. Preferably the lowest corner of the nut is one where the curvature is of greatest radius, so that when the nut is screwed down with right hand revolution, the very gradually curved under surface at the corner will be the first portion of the nut to strike. This corner is designated 18.

Figure 3:
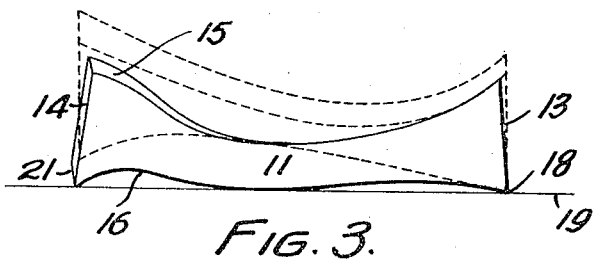
Fig. 3 is an enlarged elevation illustrating the twisting of the nut when fully tightened down.

When the nut is screwed down on a bolt projecting at right angles from a surface 19, which may be the top of an ordinary nut, the first part of the nut to strike the surface is the corner 18. As the screwing down operation continues, the central portion of the nut which is not yet in contact with the surface 19 continues to move downwardly, while the corner 18 remains at the same level. This continues until the lower edge 20 of the side 13 is entirely in contact with the surface 19 and one corner of the lower edge 21 of the side 14 just coming into contact with the surface 19, this edge retaining its original inclination. It will thus be seen that the nut has been given a very slight twist which causes the threads thereof to bind very tightly on the threads of a bolt. At the same time, the central portion of the nut has been moving down on the bolt threads, so that the concave lower face 16 of the nut has been very largely flattened out, and the concavity of the upper face increased, as clearly shown in Fig. 3. This second distortion of the nut causes the threads thereof to further grip the threads of the bolt, and the nut to lock itself securely to the bolt independent of any other fastening. The nut may be made of material having a very slight amount of spring, so that the nut tends to return to its original form, thus maintaining a grip of the bolt threads, irrespective of the distortion. In Fig. 3, the nut is shown in full lines in its distorted position, and in dotted lines in its original form.

It will be readily seen that owing to the reversed arrangement of the concave curvature, it is immaterial which side of the nut is screwed down, as it is absolutely reversible. It will also be understood that while a square nut has been shown, the invention will also apply to hexagonal nuts. In practice it will not be necessary in the first application to screw the nut down until flattened, as in Fig. 3, so that only a very slight amount of distortion occurs. The nut may then be screwed off and used again. In the second application, it will be screwed down a little bit farther than before, so that it may be used a considerable number of times before becoming permanently flattened. The nut may be applied either over or under an ordinary nut. When applied over a nut, the two may be screwed down at a single operation of the wrench, until the ordinary nut is tight. The lock nut is then gives a slight additional turn independent of the ordinary nut to produce the effects previously described. When applied under an ordinary nut, the two are applied in one operation of the wrench as before, until the lock nut bears against the surface through which the bolt projects, and distortion of the lower corner commences. The ordinary nut may now be given a slight further turn independent of the lock nut, so that the upper corner is slightly distorted. These corners bite into both the nut and surface against which it bears, and the threads pinch the bolt, so that all are locked together. The lock nut may be removed at any time with an ordinary wrench by the application of sufficient pressure to overcome its grip on the bolt threads.

Having thus described my invention, what I claim is:—

1. In a nut lock, a threaded body, the axis of the threads being inclined with respect to the normal axis of the body in the diagonal direction of the body, whereby when the axis of the threads is vertically disposed one lower corner of the body will project below all other portions of the body.

2. In a nut lock, a body concave on top and bottom in the direction of one of its diameters, and internally threaded, the axis of the threads being inclined with respect to the normal axis of the body in the direction of one of the body diagonals.

3. In a nut lock, an internally threaded body concave on top and bottom in the direction of one of its diameters, the radius of curvature increasing from right to left on the top and increasing from left to right on the bottom, the axis of the threads being inclined with respect to the normal body axis in the direction of a body diagonal.

In witness whereof, I have hereunto set my hand.

JOHN A. MacLEAN.